(12) United States Patent
Janssen et al.

(10) Patent No.: US 12,481,007 B2
(45) Date of Patent: Nov. 25, 2025

(54) SYSTEMS AND METHODS FOR TESTING ELECTRICAL CONNECTIONS BETWEEN A CHIP AND EXTERNAL CIRCUITRY

(71) Applicant: NXP B.V., Eindhoven (NL)

(72) Inventors: Erwin Johannes Gerardus Janssen, Meijel (NL); Tarik Saric, Eindhoven (NL)

(73) Assignee: NXP B.V., Eindhoven (NL)

( * ) Notice: Subject to any disclaimer, the term of this patent is extended or adjusted under 35 U.S.C. 154(b) by 233 days.

(21) Appl. No.: 18/494,088

(22) Filed: Oct. 25, 2023

(65) Prior Publication Data

US 2025/0138110 A1  May 1, 2025

(51) Int. Cl.
  *G01R 31/71*  (2020.01)
  *G01R 23/15*  (2006.01)
  *G01R 27/26*  (2006.01)
  *G01R 31/28*  (2006.01)
  *G01R 31/66*  (2020.01)

(52) U.S. Cl.
  CPC .............. *G01R 31/71* (2020.01); *G01R 23/15* (2013.01); *G01R 27/2605* (2013.01); *G01R 31/2853* (2013.01); *G01R 31/66* (2020.01)

(58) Field of Classification Search
  CPC ........ G01R 27/00; G01R 27/02; G01R 27/26; G01R 27/2605; G01R 23/00; G01R 23/02; G01R 23/15; G01R 31/00; G01R 31/28; G01R 31/2851; G01R 31/2853; G01R 31/2855; G01R 31/2872; G01R 31/2881; G01R 31/2884; G01R 31/302; G01R 31/303; G01R 31/50; G01R 31/66; G01R 31/70; G01R 31/71

USPC ......................................... 324/500, 537, 538
See application file for complete search history.

(56) References Cited

U.S. PATENT DOCUMENTS

| | | | |
|---|---|---|---|
| 5,208,531 A | * | 5/1993 | Aton .................... G01R 31/308 |
| | | | 324/96 |
| 8,030,943 B2 | | 10/2011 | Spuhler et al. |
| 9,435,842 B2 | | 9/2016 | Vaucher et al. |
| 11,018,635 B2 | * | 5/2021 | Thuriés .............. G01R 31/2853 |
| 12,282,058 B2 | * | 4/2025 | Fayneh ................ G04F 10/005 |
| 2020/0191862 A1 | | 6/2020 | Abhishek et al. |

FOREIGN PATENT DOCUMENTS

| | | | | |
|---|---|---|---|---|
| CN | 104838389 A | * | 8/2015 | ............. H05K 3/301 |
| CN | 112106028 B | * | 7/2024 | ............ G06F 13/409 |
| DE | 10240897 A1 | * | 4/2004 | ............. H01L 22/34 |

OTHER PUBLICATIONS

Takeji Fujibayashi, et al., "A 76- to 81-GHz Multi-Channel Radar Transceiver," IEEE Journal of Solid-State Circuits, Sep. 2017, pp. 2226-2241, vol. 52, No. 9, doi: 10.1109/JSSC.2017.2700359, publisher IEEE.

* cited by examiner

*Primary Examiner* — Hoai-An D. Nguyen

(57) ABSTRACT

Systems and methods for testing electrical connections between a chip and external circuitry are discussed. In some embodiments, a chip may include an Input/Output (I/O) terminal and a test circuit coupled to the I/O terminal, wherein an oscillating frequency of the test circuit changes in response to an impedance change at the I/O terminal due to a connection failure or degradation.

20 Claims, 3 Drawing Sheets

SYSTEMS AND METHODS FOR TESTING ELECTRICAL CONNECTIONS BETWEEN A CHIP AND EXTERNAL CIRCUITRY

FIELD

This disclosure relates generally to electronic circuits, and more specifically, to systems and methods for testing electrical connections between a chip and external circuitry.

BACKGROUND

An Integrated Circuit (IC) is a set of electronic circuits fabricated on a piece of semiconductor material (e.g., silicon). With the advent of modern semiconductor manufacturing techniques, an ever-increasing number of miniaturized transistors and other IC components may now be integrated into a single electronic package, chip, or microchip. For example, a modern System-on-Chip (SoC) may include most (or all) components of an entire computer or data processing system.

To communicate with external devices, a chip may have a multitude of electrical connections. An example of such a connection is the solder joint.

The inventors hereof have recognized that the ever-increasing number of electrical connections necessary for the operation of complex chips represents a reliability concern insofar as any such connection can be subject to failures due to manufacturing defect, impact, stress, fatigue, etc.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

DETAILED DESCRIPTION

Systems and methods for testing electrical connections are described. In various embodiments, a test circuit may be configured to monitor the integrity of a connection between a chip and an external circuit or device, such as an antenna, another chip, etc.

Generally, an external circuit presents an additional shunt impedance to a chip's output terminal, next to an on-chip shunt capacitance configured to provide electrostatic discharge (ESD) protection. In some implementations, a test circuit may include an RC-oscillator connected to an ESD protection circuit and to a chip's on-chip wiring. In case of a connection failure, the electrical path towards the additional shunt impedance is at least partially opened, thus resulting in a change in the oscillation frequency of the RC-oscillator.

The test circuit may be used in situations when the external circuit behaves as (i) a DC open or (ii) a DC short (to the chip).

For example, if the shunt impedance presented by an external circuit behaves capacitively (as a DC open), the test circuit may be configured to oscillate at a selected test frequency when the connection is proper, intact, suitable, functional, or operational, such that failure or degradation of the connection's integrity would result in a greater oscillating frequency. Conversely, if the shunt impedance of the external circuit behaves as a DC short, an oscillating frequency of 0 Hz would indicate that the connection is proper, and deviation from 0 Hz In the case of a proper chip connection, the low-frequency impedance at the chip pin is different compared to the case of a connection failure. This allows for relatively low-frequency testing of a pin connection interfacing to a high-frequency load, such as a millimeter wave (mmWave) antenna or launcher. Also, the use of low-frequency testing results in reduced complexity compared to high-frequency testing methods.

Accordingly, in different applications, systems and methods described herein may provide greater accuracy (reducing the probability of measurement error), reduced impact on high-frequency performance (because of the absence of components placed in the high-frequency signal path that would otherwise be necessary to implement conventional detection techniques), and reduced power consumption (low-frequency circuits typically consume less power than high-frequency circuits).

Figure 1:
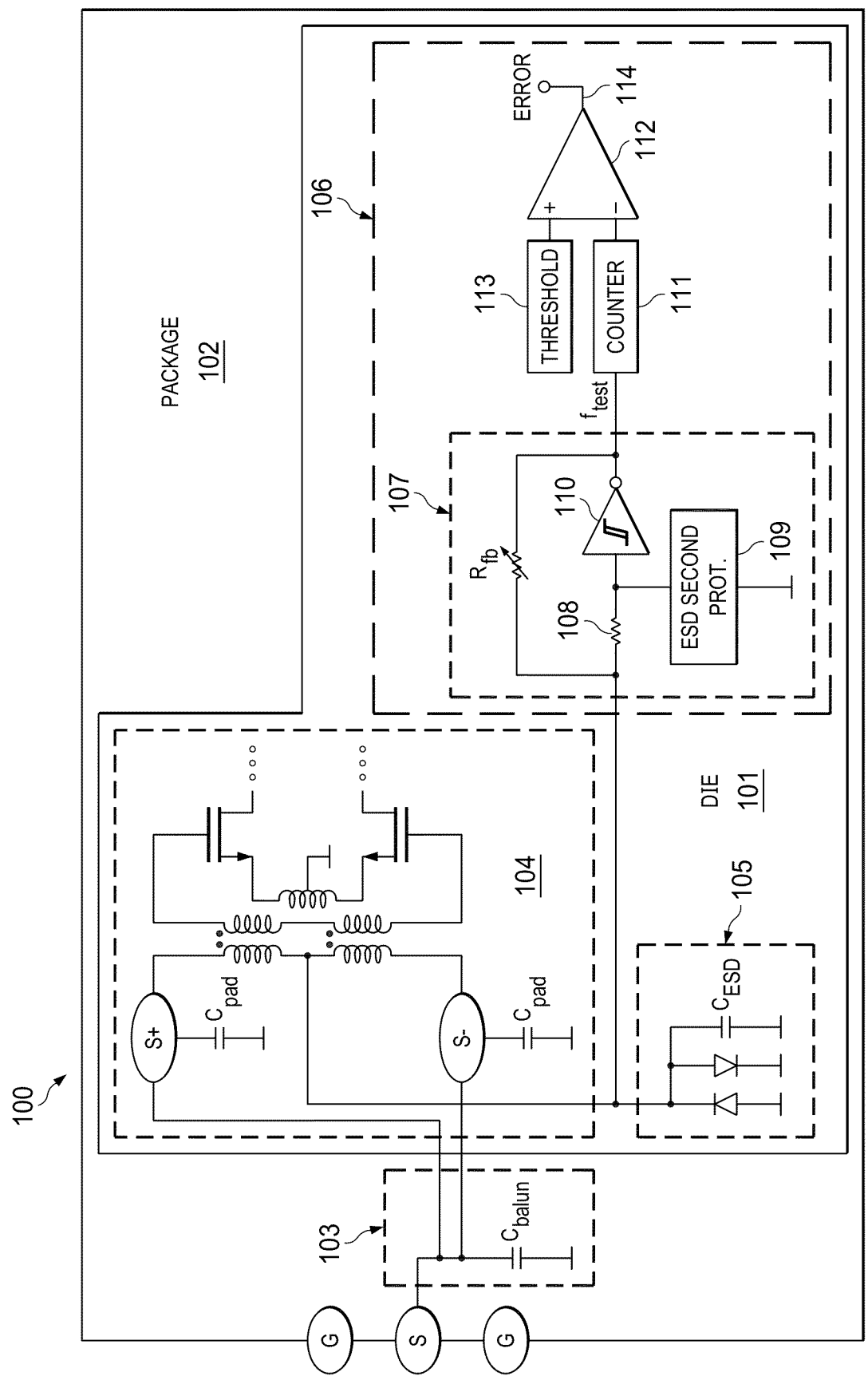
FIG. 1 is a diagram of an example of a system for testing an electrical connection between a chip and an external circuit or device, according to some embodiments.

In that regard, FIG. 1 is a diagram of an example of a system for testing an electrical connection between chip 100 and external circuit or device 200A or 200B (FIG. 2). As shown, chip 100 includes semiconductor die 101 encapsulated by electronic package 102.

For simplicity, electronic package 102 includes a signal (S) pad, pin, or terminal, and two ground (G) pads, pins, or terminals. In practical implementations, however, tens or hundreds of pads, pins, or terminals may be present.

In this example, the S pad is coupled to Integrated Circuit (IC) 104 fabricated on semiconductor die 101 via balun circuit 103, which has a single line coupled to two differential lines with parasitic capacitance $C_{balun}$, as shown. If the main application of chip 101 is a high-frequency RF application (e.g., automotive radar), for instance, IC 104 may include a transformer, matching network, etc. coupled to a Radio Frequency (RF) transceiver.

Semiconductor die 101 also includes ESD protection circuit 105, which has two diodes and parasitic capacitance $C_{ESD}$, as shown. Test circuit 106 is integrated into to die 101 and coupled to a node between IC 104 and ESD protection circuit 105. In other applications, test circuit 106 may be external to die 101.

Test circuit 106 is coupled to the S pad through 103 and 104. Particularly, test circuit 106 includes relaxation oscillator 107 coupled to counter 111. Relaxation oscillator 107 includes resistor 108 (provide ESD protection together with 109, but not otherwise required) at the input of Schmitt trigger 110. Feedback resistor $R_{fb}$ is coupled between the input and output of Schmitt trigger 110, and second ESD circuit 109 may also be used as shown.

In operation, relaxation oscillator 107 is configured to operate at a test frequency ($f_{test}$) in situations where the connection between chip 101 and an external device coupled to the S pad is proper. In some cases, relaxation oscillator 107 may be configured to oscillate with an $f_{test}$ that is one-to-one related to the time constant given by the product of $R_{fb}$ and the total capacitance connected to the S pad.

The oscillating frequency of relaxation oscillator 107 increases, however, when there is a fault or after sufficient degradation in the connection, which is indicated by an impedance or capacitance change at the connection (e.g., because of cracks in a solder joint or the like at the S pad).

Counter 111 increments a value that indicates a number of times Schmitt trigger 110 changes its state for a selected period of time (after which it automatically resets), and therefore stores a value indicative of a frequency of oscillation of relaxation oscillator 107. Counter 111 is coupled to the inverting input of comparator 112.

Threshold register 113 is configured with a frequency threshold value. When the frequency of oscillation of relaxation oscillator 107 overcomes the frequency threshold value, comparator 112 changes the state of error signal 114 (e.g., from "1" to "0"), thereby reporting a connection failure; which in turn may be handled by a safety circuit or process within chip 100.

Figure 2A:
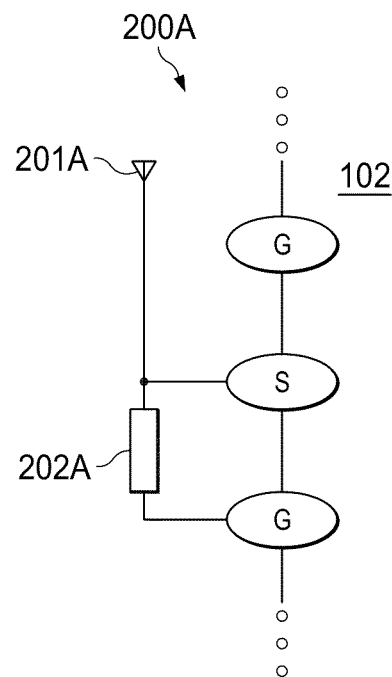
FIG. 2A is a circuit diagram of an example of a first external circuit or device, according to some embodiments.

FIG. 2A is a circuit diagram of an example of external circuit or device 200A. In this example, external circuit or device 200A comprises antenna 201A coupled to the S pad and to a G pad of package 102 via ¼ wave stub 202A; therefore, it behaves as a DC short. When a solder ball breaks at the S pad, the S pad is no longer shorted to the G pad, producing a non-zero $f_{test}$. In case of a ball break, when the value of counter 111 exceeds the value of threshold register 117, comparator 212 reports a connection failure.

Figure 2B:
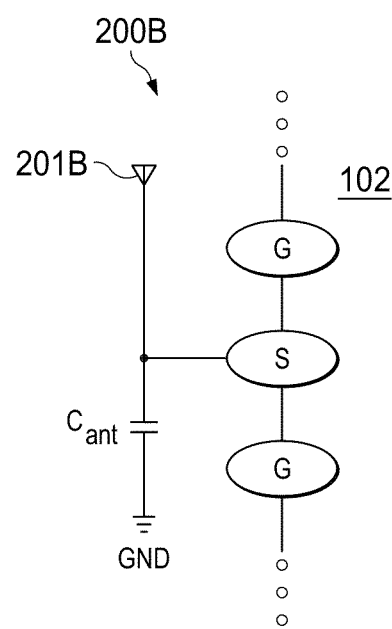
FIG. 2B is a circuit diagram of an example of second external circuit or device, according to some embodiments.

FIG. 2B is a circuit diagram of an example of external circuit or device 200B. In this implementation, external circuit or device 200B comprises antenna 201B coupled to the S pad of package 102 and to parasitic capacitance Cant; therefore it behaves as a DC open. In the event of a solder ball joint break the capacitive load changes, thus producing a corresponding change in $f_{test}$. In case of a ball break, when the value of counter 111 exceeds the value of threshold register 117, comparator 212 reports a connection failure.

If there is a proper connection between chip 100 and antenna 200A, the S pad is shorted to the G pad, which is galvanically connected to the ground (GND) on chip 100. Therefore, the voltage across ESD diodes 105 does not change, causing relaxation oscillator 107 not to oscillate ($f_{test}$=0 Hz) such that the value of counter 111 does not increase.

Conversely, if the connection is faulty, relaxation oscillator 107 operates with a first oscillating at a frequency determined by Rib and the total capacitance connected to its input, such that counter 111 registers a non-zero value. Then, in case of a ball break, when the value of counter 111 exceeds the value of threshold register 117, comparator 112 reports a connection failure.

As the inventors hereof have determined, the difference introduced by a ball-break failure is sufficient to make a reliable judgement of connection failure. Particularly, a typical setup may produce a difference of at least a factor of two in capacitive loading for relaxation oscillator 107. The oscillation frequency of relaxation oscillator 107 is one-to-one related to its capacitive loading, therefore the difference in oscillation frequency also becomes greater by at least a factor of two, which makes it detectable without false positives or negatives.

It is also worth noting that the amount of capacitance in a broken solder ball joint is smaller than the capacitance added by off-chip, external circuitry 200A/B. For example, if a solder ball has a diameter of 350 μm and we model a "broken ball" as a 5 μm air gap (i.e., a crack), the different in capacitive loading is approximately 170 fF, which is much less than minimal expected off-chip capacitance (>1 pF).

Figure 3:
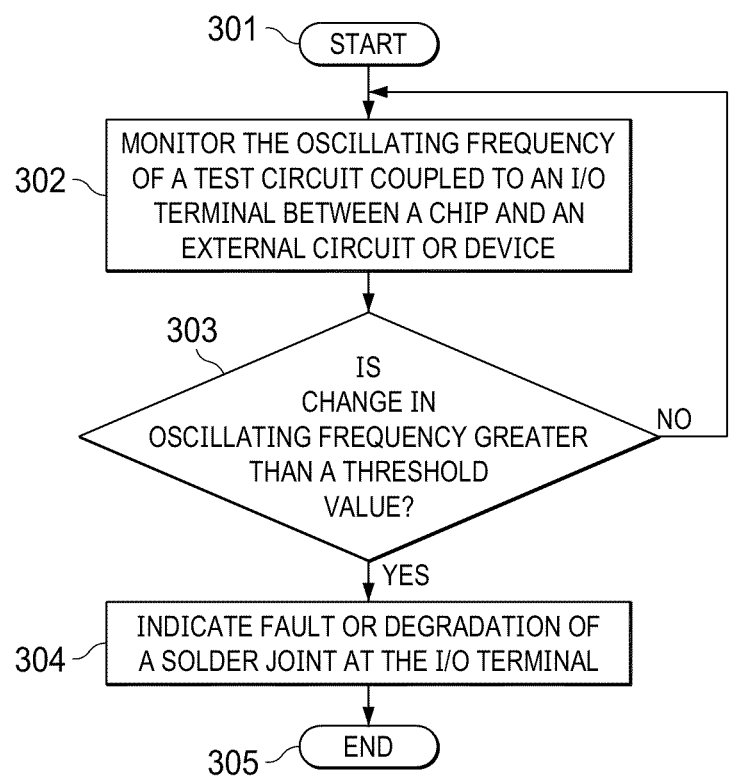
FIG. 3 is a flowchart of an example of a method for testing electrical connections between a chip and an external circuit, according to some embodiments.

FIG. 3 is a flowchart of an example of method 300 for testing electrical connections between a chip and an external circuit. In various embodiments, method 300 may be performed, at least in part, by chip 100 when coupled (or when expected to be coupled) to external circuits 200A/B.

Method 300 starts at 301. At 302, method 300 monitors an oscillating frequency of test circuit 106 coupled to the S pad (e.g., via a solder joint) at the connection between chip 100 and external circuit 200A/B. For example, counter 111 may store the number of times Schmitt trigger 110 switches its output level for a certain time window, which is indicative of the then-present oscillation frequency of relaxation oscillator 107.

At 303, method 300 determines, through the operation of comparator 118, if there has been a change in the oscillating frequency greater than a threshold value stored in register 117 (e.g., for the same window duration). If not, at 303 control returns to 302, so that monitoring may continue while chip 100 is powered on.

Otherwise, at 304, the output of comparator 118 indicates an error representative of a fault, defect, error, or degradation of the solder joint at the connection between chip 100 and external circuits 200A/B. As shown, method 300 ends at 305.

In some implementations, method 300 may be performed for multiple pins, pads, or terminals on package 102 during operation of chip 100 and/or as part of a test procedure or event. Each time a fault is detected, method 300 may also identify which pin, pad, or terminal is defective depending upon which of a plurality of test circuits indicates it. Alternatively, when a single test circuit is shared across multiple pins, pads, or terminals, the state of a multiplexer between the test circuit and the pins, pads, or terminals may indicate which pin, pad, or terminal has a defect.

As such, various systems and methods for testing electrical connections between a chip and external circuitry have been presented. In an illustrative, non-limiting embodiment, a chip may include an Input/Output (I/O) terminal and a test circuit coupled to the I/O terminal, wherein an oscillating frequency of the test circuit changes in response to an impedance change at the I/O terminal due to a connection failure or degradation.

In some implementations, the chip may include an RF transceiver coupled to the I/O terminal. The IC may be manufactured on a die encapsulated by a package, and the I/O terminal may be external to the package. The I/O terminal may be coupled to a device disposed external to the chip. The device may include an antenna. Additionally, or alternatively, the device may include another chip.

A resonance frequency of the test circuit may be selected based, at least in part, upon an impedance at the I/O terminal in the absence of the connection failure or degradation. For example, the connection failure or degradation may include a breakage or fracture of a solder joint.

The test circuit may include a relaxation oscillator. The relaxation oscillator may include a Schmitt trigger and a feedback resistor. The chip may include a counter coupled to an output of the Schmitt trigger, where the counter is configured to store a value indicative of a frequency of oscillation of the test circuit.

The chip may include a comparator coupled to the counter and to a register configured to store a threshold value below which an increase in the frequency of oscillation indicates the connection failure or degradation.

In the absence of the connection failure or degradation, the relaxation oscillator does not oscillate when an antenna coupled to the I/O terminal behaves as a DC short between an S-pad and a G-pad. Moreover, in the absence of the connection failure or degradation, the frequency of oscillation is smaller than a frequency of operation of a main application of the chip.

In another illustrative, non-limiting embodiment, a test circuit, may a Schmitt trigger and a feedback resistor coupled across an input and an output of the Schmitt trigger, where the input of the Schmitt trigger is coupled to an electrical pad of a chip, and where the test circuit is configured to oscillate with a frequency indicative of a connection integrity between the chip and an external device coupled to the electrical pad.

The test circuit may have a resonance frequency selected based, at least in part, upon an impedance at the I/O terminal in the absence of fault or degradation of a solder joint at the electrical pad. In response to the connection being intact, the test circuit may not oscillate when an antenna coupled to the I/O terminal behaves as a DC short between an S-pad and a G-pad.

In yet another illustrative, non-limiting embodiment, a method may include: monitoring an oscillating frequency of a test circuit coupled to a connection between a chip and an antenna; and in response to a change in the oscillating frequency greater than a threshold value, identifying fault or degradation of a solder joint at the connection.

The oscillating frequency may change in response to a change in a parasitic capacitance. Also, an increase in the oscillating frequency may indicate reduced connection integrity.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

For sake of brevity, conventional techniques have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A chip, comprising:
   an Input/Output (I/O) terminal; and
   a test circuit coupled to the I/O terminal, wherein an oscillating frequency of the test circuit changes in response to an impedance change at the I/O terminal due to a connection failure or degradation.

2. The chip of claim 1, wherein the chip comprises a Radio Frequency (RF) transceiver coupled to the I/O terminal.

3. The chip of claim 1, wherein the IC is manufactured on a die encapsulated by a package, and wherein the I/O terminal is external to the package.

4. The chip of claim 1, wherein the I/O terminal is coupled to a device disposed external to the chip.

5. The chip of claim 4, wherein the device comprises an antenna.

6. The chip of claim 4, wherein the device comprises another chip.

7. The chip of claim 1, wherein a resonance frequency of the test circuit is selected based, at least in part, upon an impedance at the I/O terminal in the absence of the connection failure or degradation.

8. The chip of claim 7, wherein the connection failure or degradation comprises a breakage or fracture of a solder joint.

9. The chip of claim 1, wherein the test circuit comprises a relaxation oscillator.

10. The chip of claim 6, wherein the relaxation oscillator comprises a Schmitt trigger and a feedback resistor.

11. The chip of claim 1, further comprising a counter coupled to an output of the Schmitt trigger, wherein the counter is configured to store a value indicative of a frequency of oscillation of the test circuit.

12. The chip of claim 11, further comprising a comparator coupled to the counter and to a register configured to store a threshold value below which an increase in the frequency of oscillation indicates the connection failure or degradation.

13. The chip of claim 11, wherein in the absence of the connection failure or degradation, the relaxation oscillator does not oscillate when an antenna coupled to the I/O terminal behaves as a DC short between an S-pad and a G-pad.

14. The chip of claim 11, wherein in the absence of the connection failure or degradation, the frequency of oscillation is smaller than a frequency of operation of a main application of the chip.

15. A test circuit, comprising:
a Schmitt trigger; and
a feedback resistor coupled across an input and an output of the Schmitt trigger, wherein the input of the Schmitt trigger is coupled to an electrical pad of a chip, and wherein the test circuit is configured to oscillate with a frequency indicative of a connection integrity between the chip and an external device coupled to the electrical pad.

16. The test circuit of claim 15, wherein the test circuit has a resonance frequency selected based, at least in part, upon an impedance at the I/O terminal in the absence of fault or degradation of a solder joint at the electrical pad.

17. The test circuit of claim 15, wherein in response to the connection being intact, the test circuit does not oscillate when an antenna coupled to the I/O terminal behaves as a DC short between an S-pad and a G-pad.

18. A method, comprising:
monitoring an oscillating frequency of a test circuit coupled to a connection between a chip and an antenna; and
in response to a change in the oscillating frequency greater than a threshold value, identifying fault or degradation of a solder joint at the connection.

19. The method of claim 18, wherein the oscillating frequency changes in response to a change in a parasitic capacitance.

20. The method of claim 18, wherein an increase in the oscillating frequency indicates reduced connection integrity.

* * * * *